Figure 1:
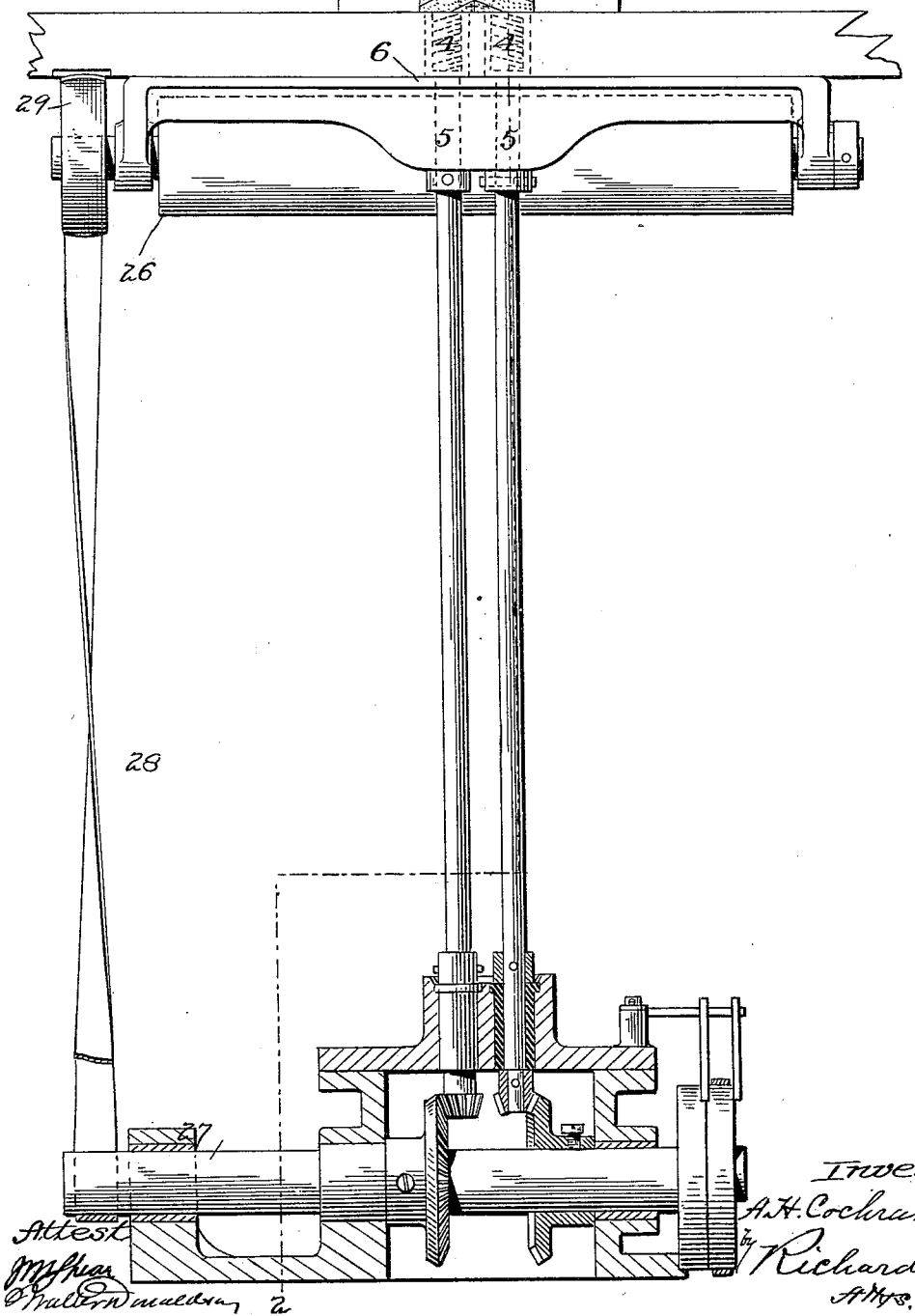

(No Model.) 2 Sheets—Sheet 1.

A. H. COCHRANE.
MACHINE FOR STEMMING TOBACCO LEAVES.

No. 546,843. Patented Sept. 24, 1895.

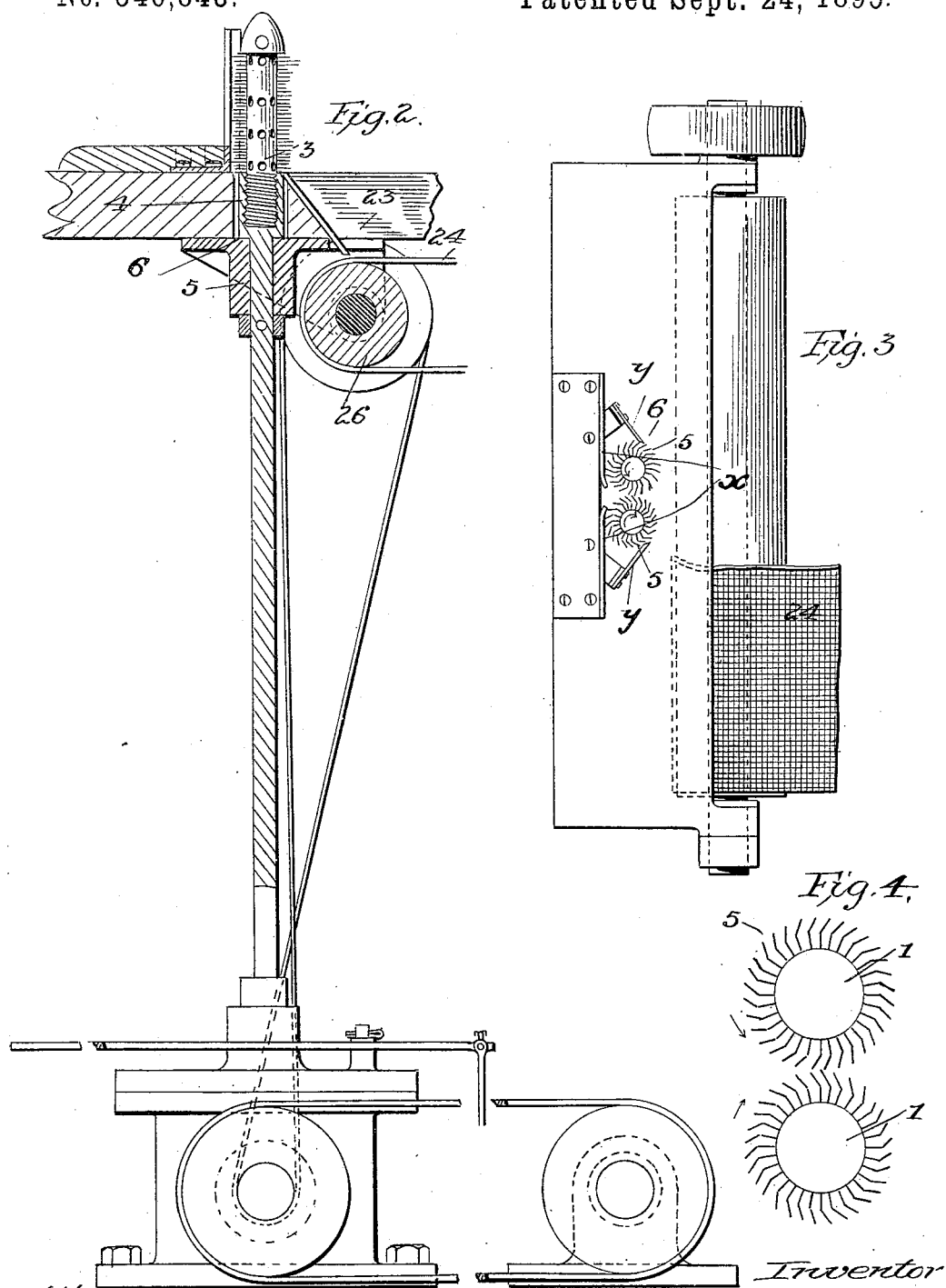

UNITED STATES PATENT OFFICE.

ARTHUR HAMILTON COCHRANE, OF LONDON, ENGLAND.

MACHINE FOR STEMMING TOBACCO-LEAVES.

SPECIFICATION forming part of Letters Patent No. 546,843, dated September 24, 1895.

Application filed June 5, 1895. Serial No. 551,706. (No model.)

*To all whom it may concern:*

Be it known that I, ARTHUR HAMILTON COCHRANE, a subject of the Queen of Great Britain, residing at London, England, have invented certain new and useful Improvements in Machines for Stemming Tobacco-Leaves, of which the following is a specification, reference being had therein to the accompanying drawings.

It is the object of my invention to provide a simple and efficient machine for stemming leaves of tobacco; and my invention consists, essentially, of a pair of rollers covered with card-clothing or like material, said rollers constantly rotating and adapted to receive between them the leaf to be stemmed, the carding-cloth being laid spirally, so as to draw the leaf between the rollers, and the operator by drawing upon the stem pulls the same from between the rollers, and thus the leaf is stemmed and falls upon an endless carrier to be conveyed to any desired point.

My invention includes two rollers covered with card-clothing, that on one roller being wound spirally and in a direction opposite to the spiral winding of the other roller, means for rotating the rollers in opposite directions, and means for supporting the rollers to leave a feeding-space at one end of the rollers for the introduction of the leaves between them.

In the drawings, Figure 1 is a front view, partly in section. Fig. 2 is a vertical section on line 2 2 of Fig. 1. Fig. 3 is a plan view of the rollers and table, and Fig. 4 is a plan view of the rollers.

The stripping-rollers may have conical heads 1, which present a flaring opening 2' for the introduction of the stem of the leaf between the rollers. The body 3 of the rollers is made of any suitable material, preferably of metal, with holes for wooden plugs to secure the carding-cloth, and is screw-threaded into a socket 4, the shank of which extends through a bearing or box 5, the shoulder 6 of the socket 4 resting upon said box.

The card-clothing is wound upon the rollers spirally, as shown in Fig. 1, the spirals on each roller being reversed in direction, and the effect of this is to give a screw action, and as soon as the leaf is grasped by the rollers it is drawn in between them, and the operator, by pulling upon the stem which he holds, draws the same through and between the rollers, completely stemming the leaf, which is stripped from the stem and falls down the incline 23 to and upon the endless belt or apron 24, and is thus carried away.

The endless apron passes around the roller 26, supported in hangers beneath the table, which is driven from the main shaft 27 by the strap 28, passing around the pulley 29 on the shaft by the rollers.

It will be noticed from Figs. 3 and 4 that the stripper-rollers revolve in opposite directions, as indicated by the arrows, and away from the front of the table and the position of the operator, so that the operator draws the stem through the rollers in a direction opposite to their movement; and one important feature of the rollers is that the teeth of the card-clothing are so placed that they incline rearwardly in relation to the direction of revolution of the rollers. This is shown in Fig. 4, and it will be seen that as the leaf is drawn through it is acted upon by receding teeth, which therefore have a wiping effect upon the leaf and not a tearing action thereon, as the points do not enter the leaf, but simply strip or wipe the same from the stem.

The rollers are driven by any suitable mechanism of ordinary or improved construction.

I have provided clearers or cleaners y, arranged in rear of the guard-plates x and extending tangentially to the rollers to clean the points or card-clothing of any material which may adhere thereto.

The belt not only conveys the leaves away from the stripping-rollers, but it serves to keep the stripped leaves separated up to the point of final discharge, so that they may be inspected readily. This belt is made of open cloth or wire-gauze, so as to allow the dust which is loosened by the rollers to fall away from the leaves.

It will be understood that while I have shown the rollers vertically arranged they may be located horizontally or at any angle with equally good results.

I claim as my invention—

1. A machine for stemming tobacco leaves consisting of two rollers covered with card clothing, that on one roller being wound spirally and in a direction opposite to the spiral winding of the other roller, means for rotating the rollers in opposite directions and means for supporting the rollers to leave a feeding space at one end for the introduction of the leaves between them, substantially as described.

2. A machine for stemming tobacco leaves, consisting of two rollers covered with card clothing, that on one roller being wound spirally and in a direction opposite to the spiral winding of the other roller, the points of said card clothing inclining backwardly from the direction of rotation, means for supporting the rollers to leave a feeding space at one end for the introduction of the leaves between them and means for rotating the rollers, substantially as described.

3. A tobacco stemming machine comprising a pair of rollers having teeth arranged spirally and in opposite directions, and flaring guiding means at the ends of the rollers for directing the leaves to the bight of the rollers, substantially as described.

In testimony whereof I affix my signature in presence of two witnesses.

ARTHUR HAMILTON COCHRANE.

Witnesses:
F. L. MIDDLETON,
HENRY E. COOPER.